(12) United States Patent
Gurdan et al.

(10) Patent No.: US 11,314,245 B2
(45) Date of Patent: Apr. 26, 2022

(54) AERIAL DISPLAY MORPHING

(71) Applicant: Intel Corporation, Santa Clara, CA (US)

(72) Inventors: Tobias Gurdan, Germering (DE); Daniel Gurdan, Deutsch (DE)

(73) Assignee: Intel Corporation, Santa Clara, CA (US)

(*) Notice: Subject to any disclaimer, the term of this patent is extended or adjusted under 35 U.S.C. 154(b) by 374 days.

(21) Appl. No.: 15/721,137

(22) Filed: Sep. 29, 2017

(65) Prior Publication Data
US 2018/0136646 A1 May 17, 2018

Related U.S. Application Data

(60) Provisional application No. 62/421,372, filed on Nov. 13, 2016.

(51) Int. Cl.
| | |
|---|---|
| G05D 1/00 | (2006.01) |
| B64C 39/02 | (2006.01) |
| B64D 47/02 | (2006.01) |
| G08G 5/00 | (2006.01) |
| G08G 5/04 | (2006.01) |
| G09F 21/06 | (2006.01) |
| G05D 1/10 | (2006.01) |

(52) U.S. Cl.
CPC ......... *G05D 1/0027* (2013.01); *B64C 39/024* (2013.01); *B64D 47/02* (2013.01); *G05D 1/104* (2013.01); *G08G 5/0013* (2013.01); *G08G 5/0026* (2013.01); *G08G 5/0034* (2013.01); *G08G 5/0043* (2013.01); *G08G 5/0069* (2013.01); *G08G 5/04* (2013.01); *G08G 5/045* (2013.01); *G09F 21/06* (2013.01); *B64C 2201/024* (2013.01); *B64C 2201/027* (2013.01); *B64C 2201/108* (2013.01); *B64C 2201/12* (2013.01); *B64C 2201/143* (2013.01); *B64C 2201/146* (2013.01); *B64C 2201/165* (2013.01)

(58) Field of Classification Search
CPC .................................................... G05D 1/0027
See application file for complete search history.

(56) References Cited

U.S. PATENT DOCUMENTS

| | | | |
|---|---|---|---|
| 9,104,201 B1* | 8/2015 | Pillai | B64C 39/024 |
| 9,646,502 B1* | 5/2017 | Gentry | G08G 5/0039 |
| 2010/0163621 A1* | 7/2010 | Ben-Asher | G05D 1/0088 |
| | | | 235/412 |
| 2014/0236388 A1* | 8/2014 | Wong | B64C 39/024 |
| | | | 701/2 |

(Continued)

*Primary Examiner* — Todd Melton
(74) *Attorney, Agent, or Firm* — Schwegman Lundberg & Woessner, P.A.

(57) ABSTRACT

Generating a morphing sequence for an aerial show may include: receiving, at a computing device comprising a processor, first frame data defining a first location for each of a plurality of drones in a first image of the aerial show; receiving, at the computing device, second frame data defining a second location for each of the plurality of drones in a second image of the aerial show; and generating the morphing sequence, the morphing sequence defining a flightpath for each of the plurality of drones to transition from the first location associated with the first image to the second location associated with the second image.

21 Claims, 9 Drawing Sheets

(56) References Cited

U.S. PATENT DOCUMENTS

| | | | |
|---|---|---|---|
| 2014/0249693 A1* | 9/2014 | Stark | B64C 39/024 |
| | | | 701/2 |
| 2017/0137125 A1* | 5/2017 | Kales | B64C 39/024 |
| 2017/0178516 A1* | 6/2017 | Shenfeld | G08G 5/0008 |
| 2017/0221394 A1* | 8/2017 | Garcia Morchon | G05D 1/104 |
| 2017/0285664 A1* | 10/2017 | Wang | B64C 39/024 |
| 2018/0231972 A1* | 8/2018 | Woon | G08G 5/0021 |

* cited by examiner

AERIAL DISPLAY MORPHING

CROSS-REFERENCE TO RELATED APPLICATIONS

This application is related to and claims priority to U.S. Provisional Application No. 62/421,372 filed on Nov. 13, 2016, the content of which is hereby incorporated in its entirety.

TECHNICAL FIELD

Embodiments described generally herein relate to drones. Some embodiments relate to morphing an aerial display from a first frame to a second frame.

BACKGROUND

An unmanned aerial vehicle (UAV), commonly known as a drone, is an aircraft without a human pilot aboard. The size of drones may range from small hobby scale suitable for close range operation proximate to a user to large scale systems capable of hauling large payloads over many miles. Drones may be used to provide services, perform military operations to reduce risk to human pilots, or as a hobby.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Drone usage is becoming more and more common as prices for drones decrease and the capabilities of drones increase. For example, as disclosed herein, drones may be programmed to launch, fly a predefined flightpath, illuminate one or more onboard light emitting diodes (LED) to create a visual image in the sky, and recover to a predetermined location. All of these activities may be accomplished without user intervention. With the increased drone capabilities and decreased costs, drone usage may be implemented in a variety of entertainment, safety, or emergency scenarios.

As disclosed herein, the drones of a plurality of drones may make up an aerial display. That is, the drones may be arranged in the sky in various fashions to form both 2D and 3D images, or frames. Because of the mobile nature of the plurality of drones, the frames may be animated as the drones move about the sky and lights (e.g., Light Emitting Diodes), or other visual signals, on the drones are active. For example, various LEDs may activate or deactivate to give the appearance of changing colors while the plurality of drones repositions to form various images.

As the plurality of drones moves from a first location to a second location within the sky, various considerations may be addressed. For example, as the plurality of drones move throughout the sky, their flightpaths may need to be considered to avoid a midair collision. Based on a drone's location within a frame of the aerial display, movement of the drones may be adjusted relative to one another so that additional frames of the aerial display may be created in an efficient manner.

Figure 1:
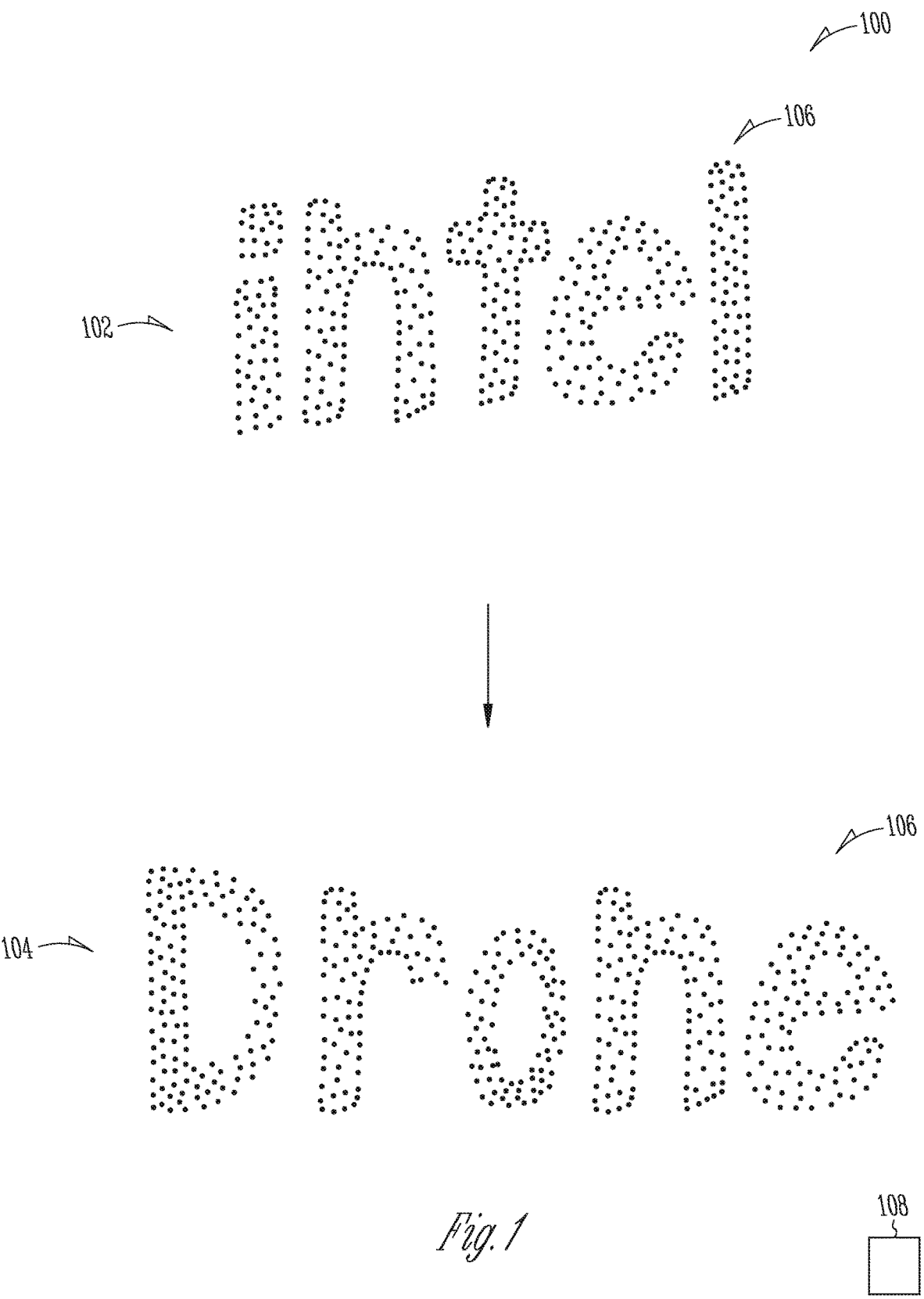
FIG. 1 illustrates an example schematic of an aerial display in accordance with some embodiments.

FIG. 1 illustrates an example schematic of an aerial display 100 in accordance with some embodiments. The aerial display 100 may include a first frame 102 and a second frame 104. The first frame 102 and the second frame may be comprised of a plurality of drones 106 (each drone represented by a dot). The number of drones in the plurality of drones 106 used to create the first frame 102 may be the same as the number of drones used to create the second frame 104. In addition, the number of drones in the plurality of drones 106 used to create the first frame 102 may be different than the number of drones in the plurality of drones 106 used to create the second frame 104. Furthermore, a lighting configuration of the plurality of drones 106 may be different for the first frame 102 and the second frame 104. For example, in the first frame 102, a subset of the plurality of drones 106 may be illuminated a first color and a second subset of the plurality of drones 106 may be illuminated a second color. In the second frame 104 the first subset of the plurality of drones may be illuminated the second color or a different color and the second subset of the plurality of drones 106 may be illuminated the first color or a different color.

As disclosed herein, a frame may be any arrangement of drones where the drones stay substantially stationary for a preset period of time. For example, the plurality of drones 106 may remain stationary in the sky for 3 seconds, thus forming a frame. The stationary aspect of a frame may be with regards to a fixed reference point. For instance, the fixed reference point may be a viewer of the frame. Stated another way, when the viewer views the drones and they appear stationary for the preset period of time, then a frame may be formed.

A frame may also be animated. For example, drones move from the first frame 102 to the second frame 104, their movement may be viewed as animation by the viewer. For instance, as the plurality of drones 106 moves from the first frame 102 to the second frame 104, their lighting configuration and flight paths may form an animation as viewed by the viewer.

As shown in FIG. 1, the first frame 102 may include the plurality of drones 106 spelling out the word "intel." The second frame 104 may include the plurality of drones 106 spelling out the word "drone." During the aerial performance, the plurality of drones 106 may transition from the first frame 102 to the second frame 104 as disclosed herein.

As disclosed herein, prior to the beginning of a presentation, the plurality of drones 106 may receive a flight profile from a computing device 108. The flight profile may include coordinates that identify a location for each drone and a time that the drone needs to be at the coordinates. Stated another way, the coordinate may be an ordered quad (e.g., ($X_i$, $Y_i$, $Z_i$, $T_i$)) that includes a latitude, longitude, altitude, and time where subscript i represents the frame number. The flight profile may include coordinates for every frame of the aerial display. In addition, the flight profile also may include a lighting sequence that identifies LEDs that may be illuminated to create the various frames of the aerial display.

The flight profile may be created by the computing device 108 which may be remote to the plurality of drones 106. In creating the flight profile, the computing device 108 may simulate flightpaths for each drone to determine flight times, lighting configurations, weather conditions, etc. to determine an efficient ordering of the plurality of drones 106. Once the flightpaths for each drone are determined, the flightpaths may be transmitted to the plurality of drones 106. As disclosed herein, the flightpaths for all of the drones in the plurality of drones 106 may be transmitted to each drone. Stated another way, each drone may receive the flightpath of the other drones of the plurality of drones 106 within the aerial display.

Figure 2:
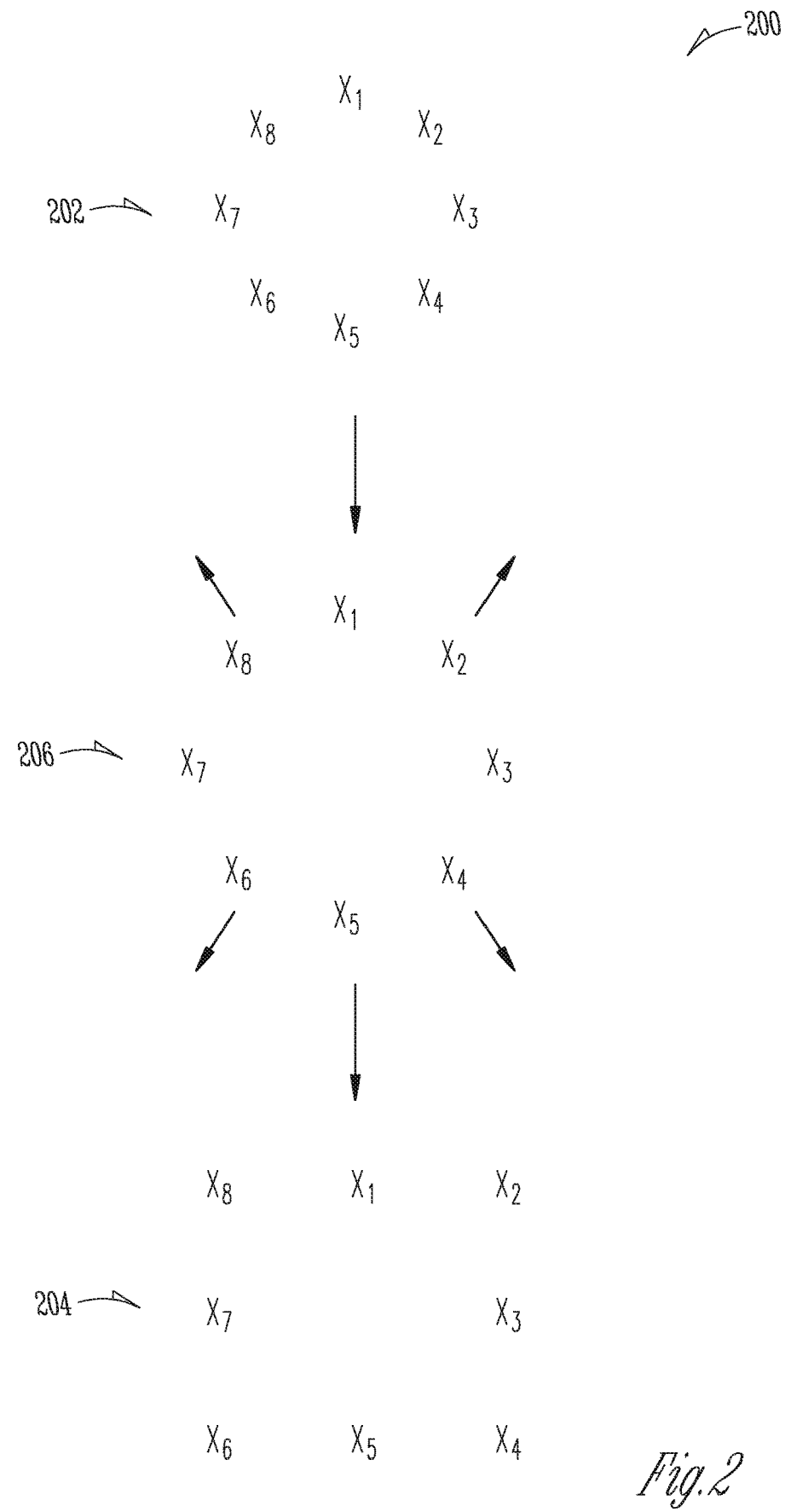
FIG. 2 illustrates an example schematic of an aerial display in accordance with some embodiments.

FIG. 2 illustrates an example schematic of an aerial display 200 in accordance with some embodiments. As shown in FIG. 2, the aerial display 200 may include a first frame 202 and a second frame 204. For simplicity, the first frame 202 and the second frame 204 each comprise eight drones, labeled 1-8.

In order to transition from the first frame 202 to the second frame 204, the flightpaths of the drones 1-8 may be determined prior to the aerial performance. For example, after launching from a launch pad the drones 1-8 may form a circular shape as shown in the first frame 202. As the aerial performance continues, the drones 1-8 may form a rectangular shape as shown in the second frame 204. As shown in a transition frame 206, drones 2, 4, 6, and 8 may move in an outward direction to form the second frame 204. In addition, the lighting configuration for each drone may remain constant or change as the frame changes. For example, as drones 2, 4, 6, and 8 transition an LED on each of drones 2, 4, 6, and 8 may change from a first color to a second color. In addition, during the transition, the LED on the drones 2, 4, 6, and 8 may be deactivated so that the movement of the drones is less noticeable to viewers.

While FIG. 2 shows a simple transition from the first frame 202 to the second frame 204, the transitions may be complicated. For example, as shown in FIG. 1, the number of drones and the difference in images from the first frame 102 to the second frame 204 may involve the plurality of drones 106 moving greater distances and in close proximity to one another. For instance, as the plurality of drones 106 (or drones 1-8) transition from one frame to another, their flightpaths may cross. As a result, the selection of the flightpaths and drone assignments may be adjusted to reduce the risks of midair collisions as disclosed herein.

Figure 3:
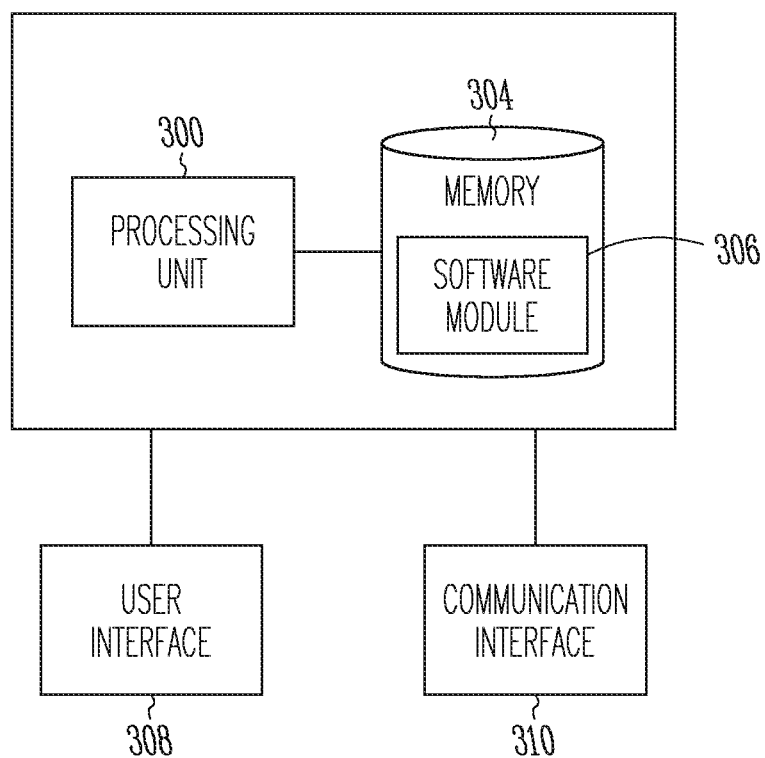
FIG. 3 illustrates an example computing device in accordance with some embodiments.

FIG. 3 shows an example schematic of a computing device 108 in accordance with some embodiments. The computing device 108 may be implemented as part of the computing network or as a standalone system. As shown in FIG. 3, the computing device 108 may include a processing unit 302 and a memory unit 304. The memory unit 304 may include a software module 306. While executing on the processing unit 302, the software module 306 may perform processes for commanding a drone, including, for example, one or more stages included in method 400 described below with respect to FIG. 4.

The computing device 108 may include a user interface 308. The user interface 308 may include any number of devices that allow a user to interface with the computing device 108. Non-limiting examples of the user interface 308 include a keypad, joystick, a display (touchscreen or otherwise), etc.

The computing device 108 may include a communications interface 310. The communications interface 310 may allow the computing device 108 to communicate with the drones 1-8 or 106 or other computing devices. Non-limiting examples of the communications interface 310 include, automatic dependent surveillance-broadcast (ADS-B) In/Out modules, cellular modules, Ethernet cards (wireless or wired), Bluetooth® transmitters and receivers, near-field communications modules, etc.

The computing device 108 may be implemented using a personal computer, a network computer, a mainframe, a handheld device, a personal digital assistant, a smartphone, or any other similar microcomputer-based workstation. The computing device 108 may be located in close proximity to the launch site. The computing device 108 may also be remote from the launch site. For instance, the computing device 108 may be located in a control room that is not in close proximity to the launch site. The computing device 108 may utilize the communications interface 310, such as a transmitter located proximate the launch site, to transmit signals and data to the plurality of drones.

As used herein, the term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. The term "application," or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the term application may be used to refer to an embodiment of software or to hardware arranged to perform at least part of any operation described herein.

While a machine-readable medium may include a single medium, the term "machine-readable medium" may include a single medium or multiple media (e.g., a centralized or distributed database, and/or associated caches and servers).

The term "machine-readable medium" may include any medium that is capable of storing, encoding, or carrying instructions for execution by a machine (e.g., the processing unit 302 or any other module) and that cause a machine to perform any one or more of the techniques of the present disclosure, or that is capable of storing, encoding or carrying data structures used by or associated with such instructions. In other words, the memory unit 304 may include instructions and may therefore be termed a machine-readable medium in the context of various embodiments. Other non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions may further be transmitted or received over a communications network using a transmission medium utilizing any one of a number of transfer protocols (e.g., frame relay, internet protocol (IP), TCP, user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1x* standards and Long Term Evolution (LTE)). Plain Old Telephone (POTS) networks, and wireless data networks (e.g., Institute of Electrical and Electronics Engineers (IEEE) 802 family of standards including IEEE 802.11 standards (WiFi). IEEE 802.16 standards (WiMax®) and others), peer-to-peer (P2P) networks, or other protocols now known or later developed.

The term "transmission medium" shall be taken to include any intangible medium that is capable of storing, encoding or carrying instructions for execution by hardware processing circuitry, and includes digital or analog communications signals or other intangible medium to facilitate communication of such software.

Figure 4:
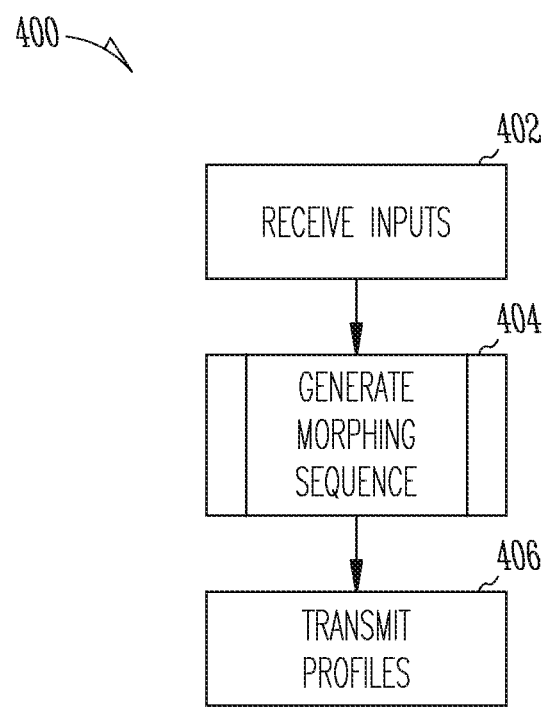
FIG. 4 illustrates an example method in accordance with some embodiments.

FIG. 4 illustrates an example method 400 in accordance with some embodiments. The method 400 may begin at stage 402 where inputs may be received. The inputs may include mapping data that identifies coordinates where a drone may be needed to form a pixel of an image, a color for an LED, etc. The input may also include weights for various parameters such as flight time, flight distance, collision avoidance, etc. For example, the mapping data may be in the form of a text file, or ANIM file that includes a drone identifier, a latitude, a longitude, an altitude, a color, a pixel number for each frame of an aerial performance, as well as a weighting factor for flight time and flightpath length, collision avoidance, etc.

In addition, weights for collision avoidance may be utilized as well. For example, a collision avoidance weight may range from 0 to 1. If the collision avoidance weight is 1, then a drone may perform any maneuver necessary to avoid a potential collision. If the collision avoidance weight is 0, then the drone may not perform maneuvers necessary to avoid a potential collision. Stated another way, the higher the collision avoidance weight assigned to a drone, the more effort the drone will put forth to avoid a collision. The collision avoidance weights may be assigned based on an importance of a drone. For example, a drone may be very important for a particular frame of the aerial show as a whole. As a result, the drone may have a collision avoidance weight of 0 so as to allow the flightpath of the drone to be direct to its assigned location. If a second drone's flightpath may cross the flight of a drone with a collision avoidance weight of 0, the second drone may have a collision avoidance weight greater than 0 so that the second drone may incorporate maneuvers necessary to avoid a collision.

As another example, drones operating near spectators may have high collision avoidance weights so as to avoid a potential collision near spectators. By default, drones may be assigned a collision avoidance weight of 0.5 such that each drone acts accordingly to avoid a collision. For example, if the flightpath of two drones cross, a collision avoidance weight of 0.5 for each drone would cause each drone to deviate in order to avoid a collision.

Figure 9C:
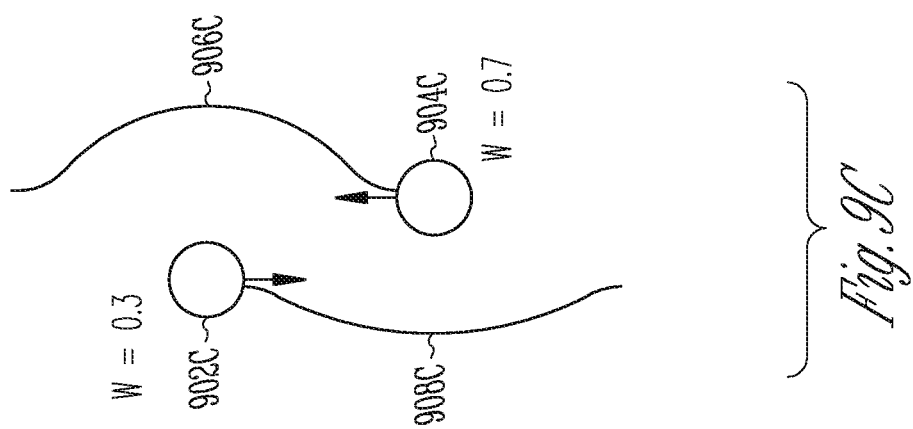
FIGS. 9A, 9B, and 9C illustrate example flightpaths in accordance with some embodiments.
Figure 9B:
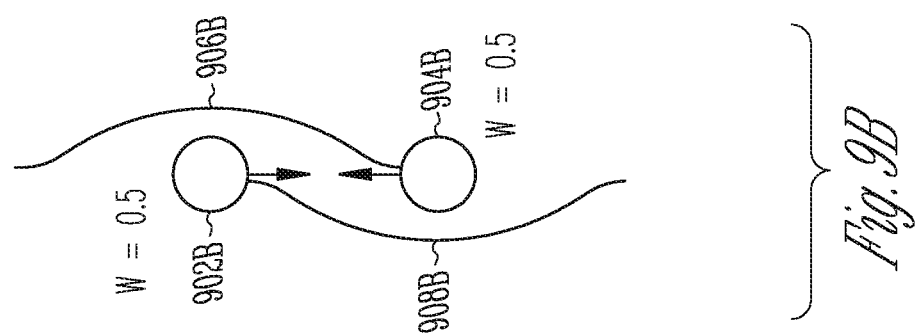
Figure 9A:
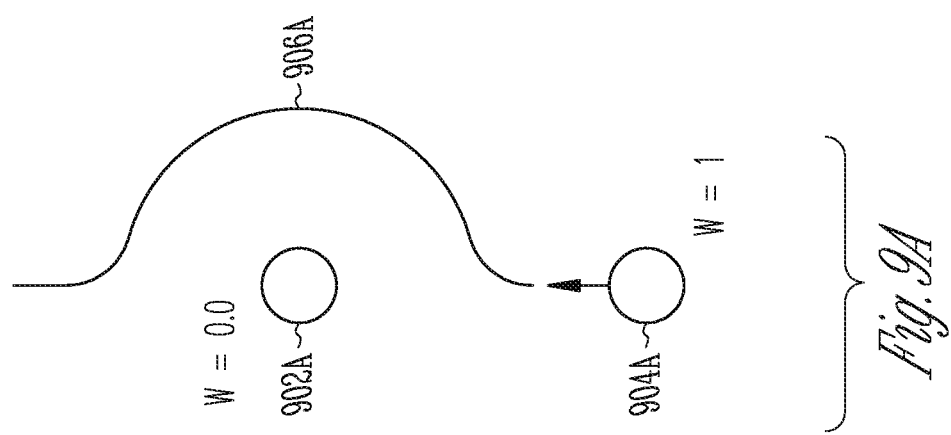

FIGS. 9A, 9B, and 9C illustrate example flightpaths in accordance with some embodiments. As shown in FIG. 9A, a first drone 902A may have a collision avoidance weight of 0 and a second drone 904A may have a collision avoidance weight of 1. As shown in FIG. 9A, the second drone 904A may alter its flightpath 906A to avoid the first drone 902A. As shown in FIG. 9B, a first drone 902B and a second drone 904B may each have a collision avoidance weight of 0.5. As a result, a flightpath 906B of the second drone 904B and a flightpath 908B of the first drone 902B may each deviate an equal amount to avoid one another. As shown in FIG. 9C, a first drone 902C may have a collision avoidance weight of 0.3 and a second drone 904B may have a collision avoidance weight of 0.7. As a result, a flightpath 906C of the second drone 904C may deviate more than a flightpath 908C of the first drone 902B to avoid one another. Stated another way, because the second drone 904C has a larger collision avoidance weight than the first drone 902C, the second drone 904C will contribute more to collision avoidance than the first drone 902C.

The collision avoidance weights may also allow each of the drones to maintain a safe distance from one another. For example, each drone may be programmed to maintain a space (e.g., 0.3 m) from other drones. The collision avoidance weights may determine how much effort one drone exerts to maintain this safety radius from other drones.

From stage 402, the method 400 may proceed to subroutine 404 where a morphing sequence for each frame may be generated. For example, as shown in FIG. 2, the morphing sequence may be for drones 2, 4, 6, and 8 to fly outwards from a center of the circular shape in the first frame 202 a distance to form the rectangular shape in the second frame 204. Generation of the morphing sequence will be described in greater detail with respect to FIG. 5.

From subroutine 404, the method 400 may proceed to stage 406 where flight profiles may be transmitted to each of the drones of the plurality of drones. For example, during the subroutine 404, a computing device may have computed flightpaths that minimize collision probabilities. The various flightpaths, velocities, etc. may be transmitted to each of the plurality of drones. Each of the drones of the plurality of drones may receive a flight profile that is specific to that individual drone, or each of the drones of the plurality of drones may receive the flight profiles for every drone used in the aerial show. By having each drone aware of the flightpath of each drone, bandwidth and computational efficiency may be achieved. For instance, each drone may have a unique identifier and each flight profile may be associated with one of the unique identifiers. Instead of making a transmission for each drone, which may number into the 100s or even 1,000s, the computing device may make a single transmission received by each drone. The individual drones of the plurality of drones may utilize their unique identifier to identify their particular flight profile from the plurality of flight profiles.

Figure 5:
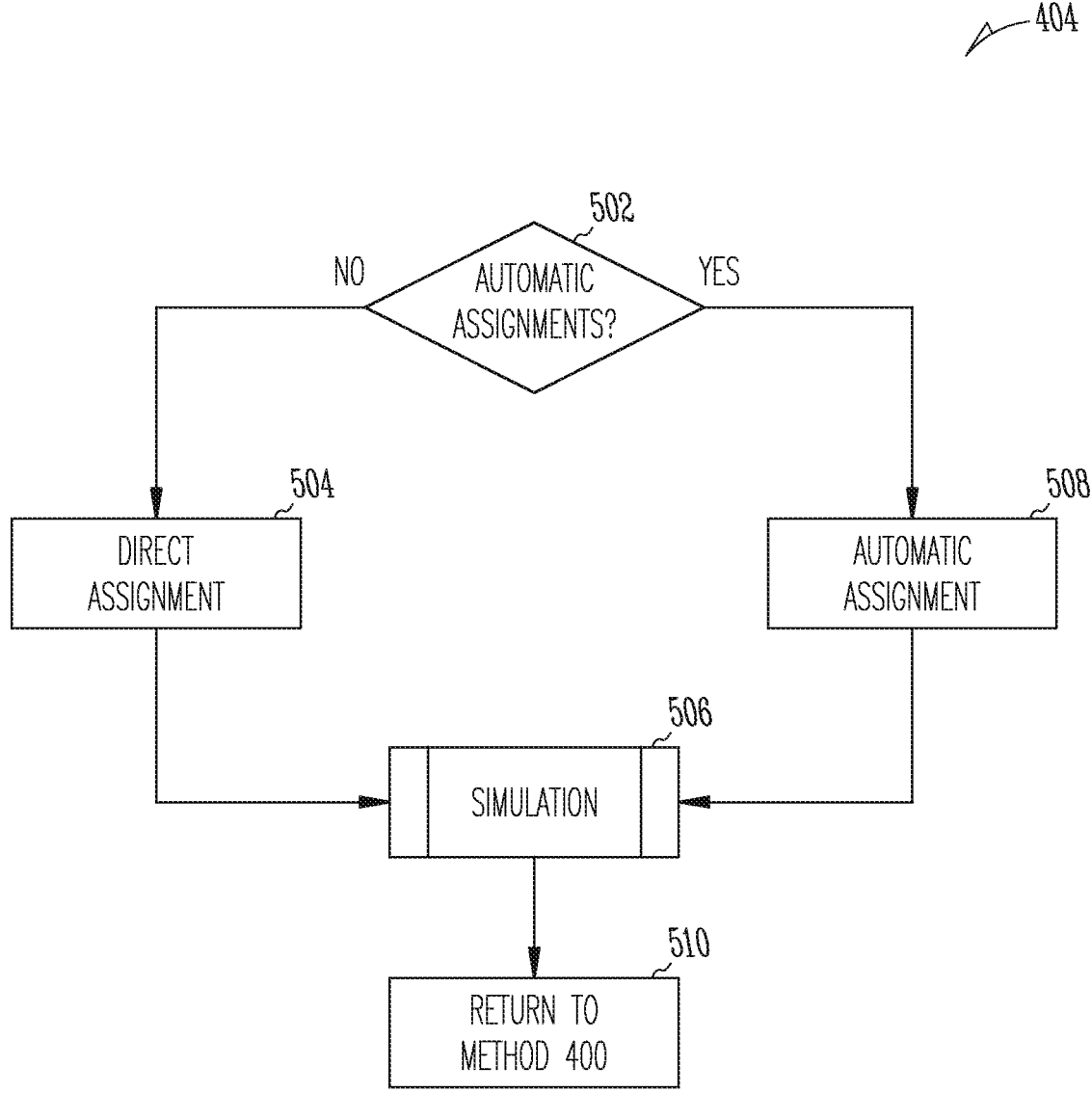
FIG. 5 illustrates an example subroutine in accordance with some embodiments.

FIG. 5 illustrates an example subroutine 404 in accordance with some embodiments. Subroutine 404 may begin at decision block 502 where a determination may be made as to whether automatic assignments are made. For example, a user may provide an input to signify which drones or a subset of drones may be used as part of a transition. In addition, the user may provide an input to signify that the user will provide flightpath information for each of the drones of the plurality of drones. The user also may provide an input to signify that the user will not provide flightpath information for each of the drones of the plurality of drones and the computing device may randomly assign drones to various pixels within a frame.

If automatic assignments are not made, then subroutine 404 may proceed to stage 504 where a user may input desired assignments. For example, the user may make a one-to-one assignment between drones of a source frame and a target frame. The direct assignments may include specific flightpaths for plurality of drones, color assignments, airspeeds, ground speeds, or any other flight characteristic. Once the direct assignments are entered, subroutine 404 may proceed to subroutine 506 where a constrained simulation may be performed as described below with regards to FIG. 6.

If automatic assignments are made, then subroutine 404 may proceed to stage 508 where a computing device (e.g., the computing device 108 of FIG. 1) may automatically select a grouping of drones or subset of drones to form the transition and assign flightpaths, color assignments, airspeeds, ground speeds, or any other flight characteristic to the plurality of drones. Drones not needed as part of a transition may remain static. For example, as shown in FIG. 2, drones 2, 4, 6, and 8 may be automatically selected in stage 508 for movement while drones 1, 3, 5, and 7 may not be selected and may remain static during the transition.

Furthermore, all of the drones may not be needed for a frame. For example, one or more drones may not be needed within a frame and thus does not need to relocate to transition from a first frame to a second frame. As a result, unused drones may deactivate their light source and remain stationary during any transitions. In addition, while a second frame is formed, drones not used in the second frame may transaction to form a third frame. For instance, the drones not used in the second frame may deactivate their light source and reposition to locations that may form a third frame of the aerial show. When it is time for the third frame to be visible, the drones may activate their light source to form the third frame.

Once the automatic assignments are made, subroutine 404 may proceed to subroutine 506 where a constrained simulation may be performed. The constrained simulation may include simulating the morphing sequence using constraints such as, but not limited to, incremental time steps as disclosed herein. After the constrained simulation is performed, the subroutine 404 may return to method 400 at stage 510.

Figure 6:
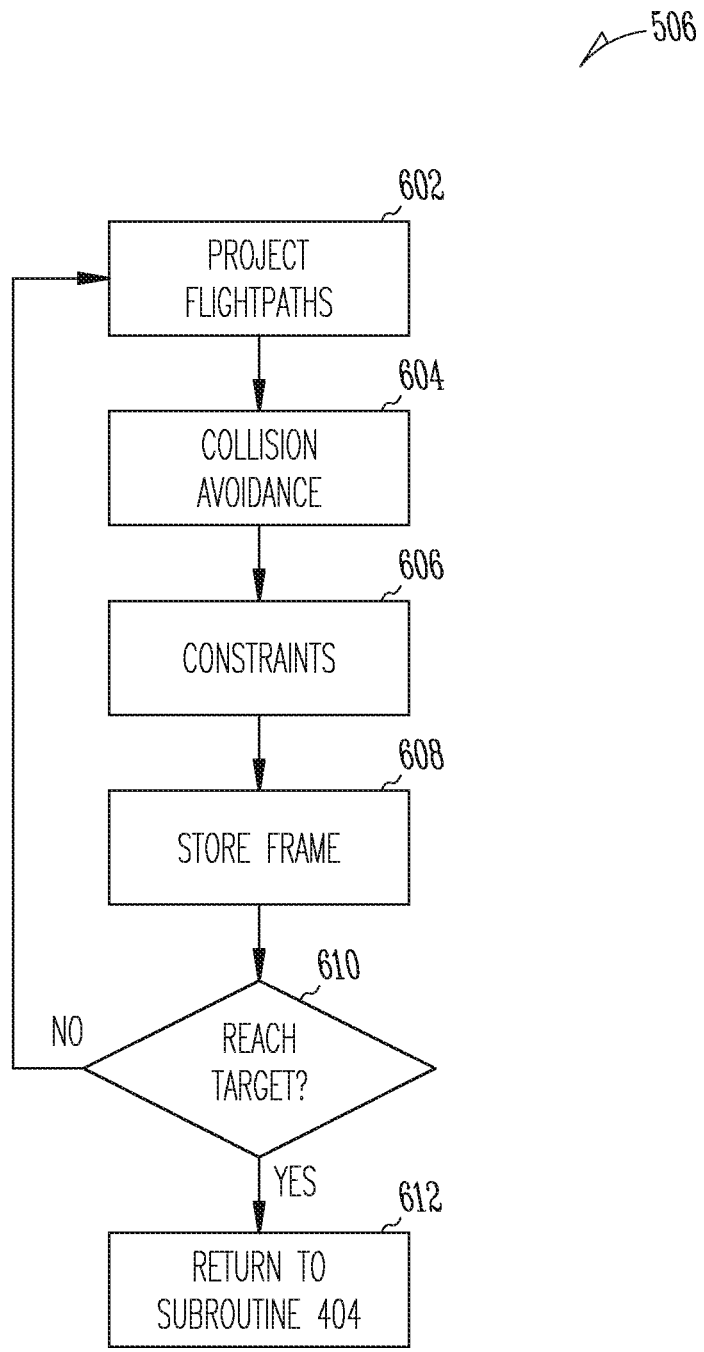
FIG. 6 illustrates an example subroutine in accordance with some embodiments.

FIG. 6 illustrates an example subroutine 506 in accordance with some embodiments. The subroutine 506 may begin at stage 602 where flightpaths from the various locations within the aerial show may be projected. For example, the various locations of the drones within each frame may be known as a parameter of the aerial show. As a result, the computing device may seek to create flightpaths that joint the various points from each of the individual frames. The flightpaths projected by the computing device may be straight lines, curved paths, or a combination of straight segments and curved segments. For instance, when progressing from the word "intel" to "drone" as shown in FIG. 1, the computing device may connect the locations of each drone in the first frame 102 and the second frame 104. The linking of each frame may be repeated for each transition.

From stage 602, the subroutine 506 may proceed to stage 604 where collision avoidance may be determined. For instance, in generating the morphing sequence the computing device may factor in the current position of each drone, performance of each drone, and the locations in the next frame where plurality of drones are needed. For example, using the current location of each drone, the coordinates of each position a drone is needed for the next frame, and the speed of each drone, the computing device may calculate a flightpath for each drone to travel to each coordinate for the next frame. Using FIG. 2 as an example, the computing device may calculate a flightpath and flight time for drone 1 to fly to the positions of drones 2-8, drone 2 to fly to the positions of drones 1 and 3-8, drone 3 to fly to the positions of drones 1, 2, and 4-8, etc.

Once the various flightpaths and flight times have been determined as disclosed herein, the computing device may determine if any of the flightpaths cross one another. If any of the flightpaths cross, there may be a possibility for a collision. For example, once the flightpath of each of the drones is determined, the computing device may determine if the sequence may result in any of the flightpaths cross and given the airspeed of each drone, if the crossing flightpaths may result in a collision. The likelihood of a collision may be determined by calculating a distance each of the drone is to an adjacent drone when flightpaths cross.

While performing collision avoidance determinations, dynamic constraints may be applied in stage 606. For example, the constrained simulations may include factors such as current weather conditions (e.g., wind speed, density altitude, temperature, pressure, etc.), drone airspeed (true airspeed or groundspeed), etc. For example, with a high-density altitude drone performance may be diminished. As a result, the airspeed of the drones may provide a time constraint. Stated another way, because of reduced airspeeds associated with high density altitudes, the distance a drone may travel within a given time may be reduced.

The constrained simulation may include stepping each drone along its flightpath in increments of time. For example, the time between frames may be 2 seconds. The constrained simulation may use the projected flightpaths and drone velocities to project a position of the drone at small increments of time (e.g., 0.1 seconds). As a result, the computing device may estimate the position of each drone in between frames to determine if any two drone would collide. Also, as part of the simulations, the velocity of the drones may be varied. For example, a drone may travel at a maximum velocity for a first part of a flightpath and at a second velocity for a second part of the flightpath. The change in velocity may be needed to avoid collisions along the flightpath and for dynamic effect during a transition from the first frame to the second frame.

Once the dynamic constraints are applied, the frames may be stored as indicated in stage 608. From stage 608, determinations may be made as to whether each of the drones is able to reach a desired target as indicated by decision block 610. Thus, simulations may determine if drones are able to reach a target location (a pixel location within a frame) within a preset time without any collisions. If the drones are able to reach desired targets without any collisions, the subroutine 506 may return to subroutine 404 (stage 612). If the drones are not able to reach a desired target in time or a collision may occur, then the subroutine returns to stage 602 where adjusted flightpaths may be projected and tested for collision avoidance as disclosed herein.

During method 400 and subroutines 404 and 506, if the distance between drones is unacceptable (e.g., any two drones are too close to one another), then the morphing sequences may be regenerated. An unacceptable distance or any two drones being too close to one another may mean that the distance between any two drones is less than a prescribed distance. The prescribed distance may be a fixed distance (e.g., 1 meter) or a function of the drone's ability to determine its location. For instance, if each of the drones has the ability to determine its position with a given precision (e.g., within 0.2 meters), then the prescribed distance may be twice the precision (e.g., 0.4 meters). The regeneration of the morphing sequence may take into consideration any past generated morphing sequences to avoid regenerating a previously generated morphing sequence.

By applying the weights to minimize various parameters to arrive of a sequence for each of the drones, the computing device may create morphing sequences that appear to move. For example, the computing device may minimize the flight time or flight distance for each of the drones. The minimization process may be achieved by simulating each drone flying the various flightpaths in differing arrangements to determine which arrangement results in the shortest overall distance flown for the drones or the shortest overall flight time to form the various frames of the aerial performance.

The morphing sequence may also be created via direct assignments. For instance, the drones may be assigned a location for each frame. The assignment may be random or follow a structured algorithm. For example, the computing device may assign a location in the next frame to a drone base on the drone being the closest drone to that location. This direct assignment may occur before the aerial performance and transmitted to the drones as disclosed herein.

Generating the morphing sequence may also include reassigning pixel numbers. For example, each drone may be identified by an ID that corresponds to a pixel within a frame. In order to optimize drone flightpaths, the pixel number associate with a drone may change during the aerial performance. By allowing pixel numbers to change, distances flown may be reduced.

Furthermore, the morphing from one frame to another may incorporate a flocking behavior. Stated another way, as the drones transition from one frame to another, the drones may move in a coordinated manner to appear more fluid and lifelike. Generally, the shortest distance and easiest flightpaths between locations within the frames may be a straight line. However, due to GPS errors, flight dynamics of each of the drones, etc. the flightpaths may need to be altered to give a more fluid like move, while still avoiding midair collisions.

In generating the morphing sequences, one or more of the stages and subroutines disclosed herein may be performed in parallel with one another. For example, the dynamic constraints discussed regarding stage 606 may be applied while collision avoidance is being determined.

Figure 7:
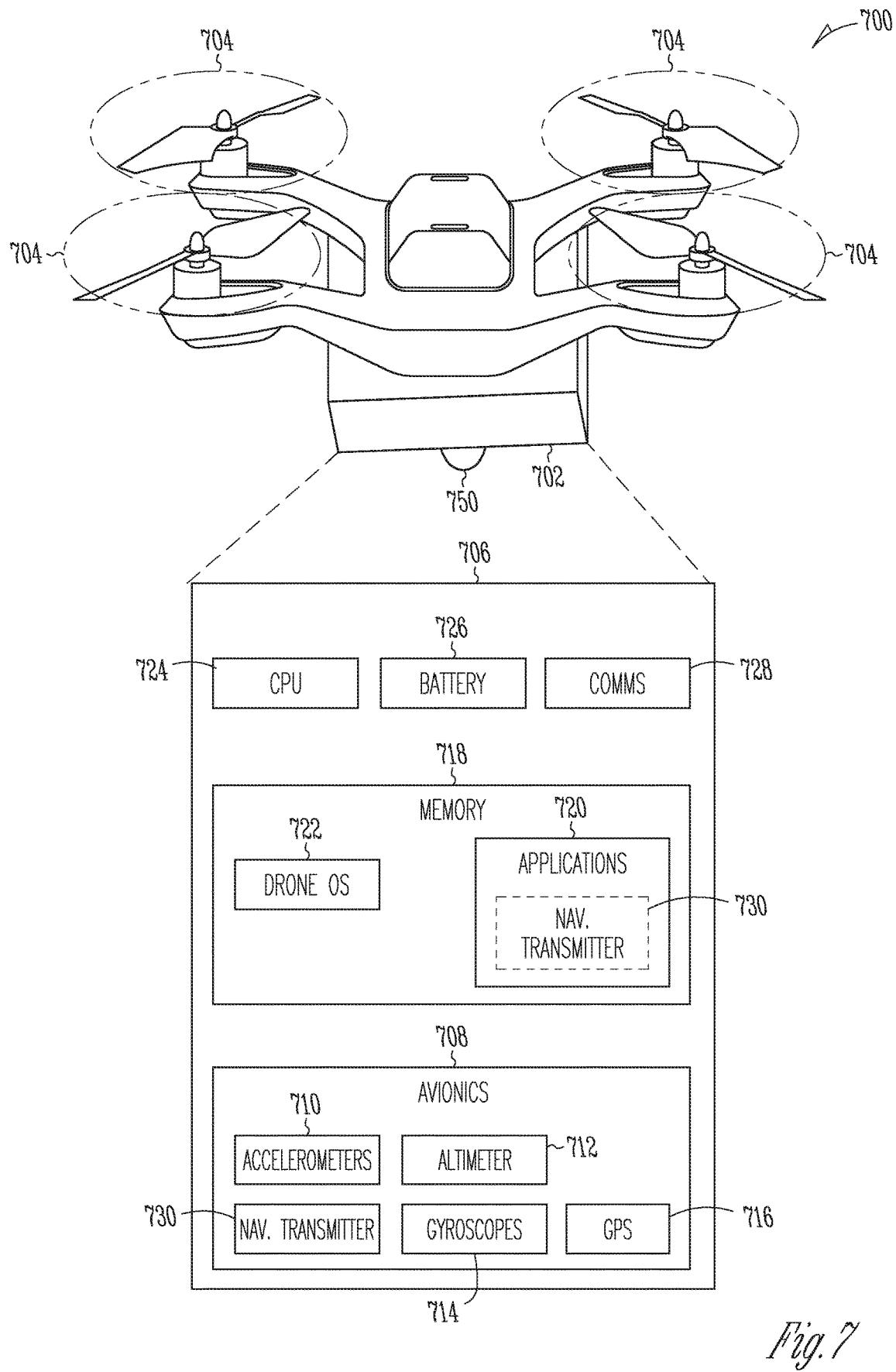
FIG. 7 illustrates an example schematic of a drone in accordance with some embodiments.

FIG. 7 shows an example schematic of the drone 700, such as one of drones 1-8 or 106. As shown in FIG. 7, the drone 700 may include an airframe 702, a flight mechanism 704, and computing environment 706. The airframe 702 may be made of made of polymers, metals, etc. and the other components of the drone 700 may be secured to the airframe 702.

The flight mechanism 704 may include mechanisms that may propel the drone 700 through the air. For example, the flight mechanism 704 may include propellers, rotors, turbofans, turboprops, etc. The flight mechanism 704 may operably interface with avionics 708. The avionics 708 may be part of the computing environment 706 (as shown in FIG. 7) or standalone components. For example, the avionics 708 may include accelerometers 710, an altimeter 712, gyroscopes 714, and a GPS receiver 716.

The various components of the avionics 708 may be standalone components or may be part of an autopilot system or other avionics package. For example, the altimeter 712 and GPS receiver 716 may be part of an autopilot system that includes one or more axes of control. For instance, the autopilot system may be a two-axis autopilot that may maintain a preset course and hold a preset altitude. The avionics 708 may be used to control in-flight orientation of the drone 700. For example, the avionics 708 may be used to control orientation of the drone 700 about pitch, bank, and yaw axes while in flight.

The avionics 708 may allow for autonomous flight. For example, as described herein, the drone 700 may receive a flightpath that the drone 700 may fly without further user input. In addition, the avionics 708 may include a navigation transmitter 730 that may be used to transmit commands to the flight mechanism 704. While FIG. 7 shows the navigation transmitter 730 as part of the avionics 708, the navigation transmitter 730 may be software stored in a memory 718 as shown by dashed navigation transmitter 730.

The computing environment 706 may also include the memory 718 that may store applications 720 and a drone operating system (OS) 722. The applications 720 may include lighting controls for controlling one or more LEDs 750. The applications 720 may include a communications program that may allow drone 700 to communicate with the computing device. In addition, the applications 720 may include software that functions as the navigation transmitter 730.

The memory 718 may provide a secure area for storage of components used to authenticate communications between the drone 700 and the computing device. For example, the memory 718 may store SSL certificates or other security tokens. The data stored in the memory 718 may be read-only data such that during operation the data cannot be corrupted or otherwise altered by malware, viruses, or by other users that may try and take control of the drone 700.

The computing environment 706 may include a central processing unit (CPU) 724, a battery 726, and a communications interface 728. The CPU 724 may be used to execute operations and method steps, such as those described herein with regard to FIGS. 5 and 7. The memory 718 also may store data received by the drone 700 as well as programs and other software utilized by the drone 700. For example, the memory 718 may store instructions that, when executed by the CPU 724, cause the CPU 724 to perform operations such as those described herein.

The communications interface 728 may include transmitters, receivers, or transceivers that may be used to communicate with the computing device. For example, the communications interface 728 may include an automatic dependent surveillance-broadcast (ADS-B) receiver (ADS-B In) or transmitter (ADS-B Out) that may send and receive data. In addition, the communications interface 728 may include a cellular interface or other wireless credential exchange modules. For example, the communications interface 728 may include an ADS-B In-and-Out module that allows the drone 700 to transmits its position to the computing device and also allow the drone 700 to receive the flightpaths and other data from the computing device.

While FIG. 7 shows various components of the drone 700, not all components shown in FIG. 7 are required. For example, drone 700 may not have the gyroscopes 714, the altimeter 712, etc.

Figure 8:
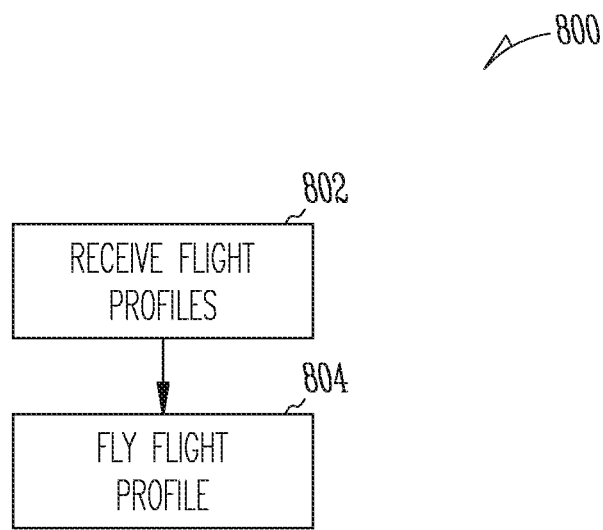
FIG. 8 illustrates an example method in accordance with some embodiments.

FIG. 8 illustrates an example method 800 in accordance with some embodiments disclosed herein. The method 800 may begin at stage 802 where a drone may receive a flight profile. As disclosed herein, the drone may receive a flight profile that defines a flightpath for the drone or the drone may receive a flight profile that defines flightpaths for each drone in an aerial show and select an appropriate flightpath from the flightpaths.

From stage 802, the method 800 may proceed to stage 804, where the drone may fly the flightpath. For example, if the drone receives a single flightpath the drone may fly the flightpath. If the drone receives all of the flightpaths for each of the drones may fly the flightpath that corresponds with drone. Flying the flightpath may include transmitting an activation signal from a CPU to a flight mechanism.

Flying the flightpath may also include the drone collecting data from its surroundings and using the data to adjust its flight characteristics. For example, a drone may utilize a GPS receiver to determine a direction of flight and a ground speed. Using the ground speed, the drone may determine a velocity that will allow the drone to arrive at a position to form a frame.

For example, if a drone is flying into a headwind, the CPU may increase power to the flight mechanism to increase the airspeed, and thus groundspeed, of the drone so that the drone arrives at the desired location. In addition, if the drone is flying with a tailwind, the CPU may decrease power to the flight mechanism to slow the drone so that the drone does not reach the desired location too soon. Stated another way, the drones are able to determine their ground speed and adjust their airspeed such that the groundspeed matches the desired velocity in the flight profile received by the drones.

EXAMPLES

Example 1 is a method for generating a morphing sequence for an aerial show, the method comprising: receiving, at a computing device comprising a processor, first frame data defining a first location for each of a plurality of drones in a first image of the aerial show; receiving, at the computing device, second frame data defining a second location for each of the plurality of drones in a second image of the aerial show; and generating, by the computing device, the morphing sequence, the morphing sequence defining a flightpath for each of the plurality of drones to transition from the first location associated with the first image to the second location associate with the second image.

In Example 2, the subject matter of Example 1 optionally includes wherein generating the morphing sequence includes minimizing a flight time for each of the plurality of drones.

In Example 3, the subject matter of any one or more of Examples 1-2 optionally include wherein generating the morphing sequence includes minimizing an overall flight time for the plurality of drones.

In Example 4, the subject matter of any one or more of Examples 1-3 optionally include wherein generating the morphing sequence includes applying a collision avoidance weight to each of the plurality of drones.

In Example 5, the subject matter of Example 4 optionally includes wherein the collision avoidance weight is equal for each of the plurality of drones.

In Example 6, the subject matter of any one or more of Examples 4-5 optionally include wherein the collision avoidance weight is greater for a first subset of the plurality of drones than for a second subset of the plurality of drones.

In Example 7, the subject matter of Example 6 optionally includes wherein the second subset of drones are active in forming the second image and the first subset of drones are not active in forming the second image.

In Example 8, the subject matter of any one or more of Examples 1-7 optionally include wherein generating the morphing sequence includes determining a velocity for each of the plurality of drones to transition from the first location to the second location.

In Example 9, the subject matter of any one or more of Examples 1-8 optionally include simulating the morphing sequence.

In Example 10, the subject matter of Example 9 optionally includes wherein simulating the morphing sequence includes stepping each of the plurality of drones from the first location to the second location in predefined increments of time.

In Example 11, the subject matter of any one or more of Examples 1-10 optionally include wherein during the morphing sequence a first subset of the plurality of drones are in a lighted state and a second subset of drones are in an unlighted state.

In Example 12, the subject matter of any one or more of Examples 1-11 optionally include transmitting the flightpath for each of the plurality of drones to each of the plurality of drones.

Example 13 is at least one computer-readable medium comprising instructions to perform any of the methods of Examples 1-12.

Example 14 is an apparatus comprising means for performing any of the methods of Examples 1-12.

Example 15 is a system for generating a morphing sequence for an aerial show, the system comprising: a processor; and a memory including instructions that, when executed by the processor, cause the processor to: receive first frame data defining a first location for each of a plurality of drones in a first image of the aerial show; receive second frame data defining a second location for each of the plurality of drones in a second image of the aerial show; and generate the morphing sequence defining a flightpath for each of the plurality of drones to transition from the first location associated with the first image to the second location associate with the second image.

In Example 16, the subject matter of Example 15 optionally includes wherein generating the morphing sequence includes instructions that, when executed by the processor, cause the processor to minimize a flight time for each of the plurality of drones.

In Example 17, the subject matter of any one or more of Examples 15-16 optionally include wherein generating the morphing sequence includes instructions that, when executed by the processor, cause the processor to minimize an overall flight time for the plurality of drones.

In Example 18, the subject matter of any one or more of Examples 15-17 optionally include wherein generating the morphing sequence includes instructions that, when executed by the processor, cause the processor to apply a collision avoidance weight to each of the plurality of drones.

In Example 19, the subject matter of Example 18 optionally includes wherein the collision avoidance weight is equal for each of the plurality of drones.

In Example 20, the subject matter of any one or more of Examples 18-19 optionally include wherein the collision avoidance weight is greater for a first subset of the plurality of drones than for a second subset of the plurality of drones.

In Example 21, the subject matter of Example 20 optionally includes wherein the second subset of drones are active in forming the second image and the first subset of drones are not active in forming the second image.

In Example 22, the subject matter of any one or more of Examples 15-21 optionally include wherein generating the morphing sequence includes instructions that, when executed by the processor, cause the processor to determine a velocity for each of the plurality of drones to transition from the first location to the second location.

In Example 23, the subject matter of any one or more of Examples 15-22 optionally include instructions that, when executed by the processor, cause the processor to simulate the morphing sequence.

In Example 24, the subject matter of Example 23 optionally includes wherein simulating the morphing sequence includes instructions that, when executed by the processor, cause the processor to step each of the plurality of drones from the first location to the second location in predefined increments of time.

In Example 25, the subject matter of any one or more of Examples 15-24 optionally include wherein during the morphing sequence a first subset of the plurality of drones are in a lighted state and a second subset of drones are in an unlighted state.

In Example 26, the subject matter of any one or more of Examples 15-25 optionally include instructions that, when executed by the processor, cause the processor to transmit the flightpath for each of the plurality of drones to each of the plurality of drones.

Example 27 is a system for generating a morphing sequence for an aerial show, the system comprising: means for receiving first frame data defining a first location for each of a plurality of drones in a first image of the aerial show; means for receiving, at the computing device, second frame data defining a second location for each of the plurality of drones in a second image of the aerial show; and means for generating the morphing sequence, the morphing sequence defining a flightpath for each of the plurality of drones to transition from the first location associated with the first image to the second location associate with the second image.

In Example 28, the subject matter of Example 27 optionally includes wherein the means for generating the morphing sequence includes means for minimizing a flight time for each of the plurality of drones.

In Example 29, the subject matter of any one or more of Examples 27-28 optionally include wherein the means for generating the morphing sequence includes means for minimizing an overall flight time for the plurality of drones.

In Example 30, the subject matter of any one or more of Examples 27-29 optionally include wherein the means for generating the morphing sequence includes means for applying a collision avoidance weight to each of the plurality of drones.

In Example 31, the subject matter of Example 30 optionally includes wherein the collision avoidance weight is equal for each of the plurality of drones.

In Example 32, the subject matter of any one or more of Examples 30-31 optionally include wherein the collision avoidance weight is greater for a first subset of the plurality of drones than for a second subset of the plurality of drones.

In Example 33, the subject matter of Example 32 optionally includes wherein the second subset of drones are active in forming the second image and the first subset of drones are not active in forming the second image.

In Example 34, the subject matter of any one or more of Examples 27-33 optionally include wherein the means for generating the morphing sequence includes means for determining a velocity for each of the plurality of drones to transition from the first location to the second location.

In Example 35, the subject matter of any one or more of Examples 27-34 optionally include means for simulating the morphing sequence.

In Example 36, the subject matter of Example 35 optionally includes wherein the means for simulating the morphing sequence includes means for stepping each of the plurality of drones from the first location to the second location in predefined increments of time.

In Example 37, the subject matter of Example undefined optionally includes, wherein during the morphing sequence a first subset of the plurality of drones are in a lighted state and a second subset of drones are in an unlighted state.

In Example 38, the subject matter of any one or more of Examples 27-37 optionally include means for transmitting the flightpath for each of the plurality of drones to each of the plurality of drones.

Example 39 is at least one computer readable medium including instructions that, when executed by a processor, cause the processor to: receive first frame data defining a first location for each of a plurality of drones in a first image of an aerial show; receive second frame data defining a second location for each of the plurality of drones in a second image of the aerial show; and generate the morphing sequence defining a flightpath for each of the plurality of drones to transition from the first location associated with the first image to the second location associate with the second image.

In Example 40, the subject matter of Example 39 optionally includes wherein generating the morphing sequence includes instructions that, when executed by the processor, cause the processor to minimize a flight time for each of the plurality of drones.

In Example 41, the subject matter of any one or more of Examples 39-40 optionally include wherein generating the morphing sequence includes instructions that, when executed by the processor, cause the processor to minimize an overall flight time for the plurality of drones.

In Example 42, the subject matter of any one or more of Examples 39-41 optionally include wherein generating the morphing sequence includes instructions that, when executed by the processor, cause the processor to apply a collision avoidance weight to each of the plurality of drones.

In Example 43, the subject matter of Example 42 optionally includes wherein the collision avoidance weight is equal for each of the plurality of drones.

In Example 44, the subject matter of any one or more of Examples 42-43 optionally include wherein the collision avoidance weight is greater for a first subset of the plurality of drones than for a second subset of the plurality of drones.

In Example 45, the subject matter of Example 44 optionally includes wherein the second subset of drones are active in forming the second image and the first subset of drones are not active in forming the second image.

In Example 46, the subject matter of any one or more of Examples 39-45 optionally include wherein generating the morphing sequence includes instructions that, when executed by the processor, cause the processor to determine a velocity for each of the plurality of drones to transition from the first location to the second location.

In Example 47, the subject matter of any one or more of Examples 39-46 optionally include instructions that, when executed by the processor, cause the processor to simulate the morphing sequence.

In Example 48, the subject matter of Example 47 optionally includes wherein simulating the morphing sequence includes instructions that, when executed by the processor, cause the processor to step each of the plurality of drones from the first location to the second location in predefined increments of time.

In Example 49, the subject matter of any one or more of Examples 39-48 optionally include wherein during the morphing sequence a first subset of the plurality of drones are in a lighted state and a second subset of drones are in an unlighted state.

In Example 50, the subject matter of any one or more of Examples 39-49 optionally include instructions that, when executed by the processor, cause the processor to transmit the flightpath for each of the plurality of drones to each of the plurality of drones.

Example 51 is a drone comprising: a flight mechanism; a processor in electrical communication with the flight mechanism; and a memory storing instructions that, when executed by the processor, cause the processor to: receive a flight plan from a remote computer, the flight plan defining a flightpath and a velocity for each of a plurality of drones to transition from a first location in a first image of an aerial display to a second location in a second image of the aerial display, and transmit an activation signal to the flight mechanism, the activation signal transmitted in accordance with the flight plan, the activation signal including instructions that cause the drone to fly the flightpath and at the velocity specified in the flight plane for the drone.

In Example 52, the subject matter of Example 51 optionally includes a position sensor, wherein the instructions, when executed by the processor, further cause the processor to: determine a velocity of the drone during flight; transmit a first signal to the flight mechanism to increase power to the flight mechanism when the velocity of the drone during flight is less than a preset velocity defined by the flight plane; and transmit a second signal to the flight mechanism to decrease power to the flight mechanism when the velocity of the drone during flight is greater than the preset velocity defined by the flight plan.

In Example 53, the subject matter of any one or more of Examples 51-52 optionally include wherein the flight plan further defines a lighting configuration for each of the plurality of drones.

In Example 54, the subject matter of Example 53 optionally includes a light source, wherein the instructions, when executed by the processor, further cause the processor to activate the light source in accordance with the lighting configuration.

In Example 55, the subject matter of any one or more of Examples 53-54 optionally include a light source, wherein the instructions, when executed by the processor, further cause the processor to deactivate the light source in accordance with the lighting configuration.

Example 56 is a method of sequencing a drone from a first image of an aerial display to a second image of the aerial display, the method comprising: receiving, at the drone from a remote computer, a flight plane, the flight plan defining a flightpath and a velocity for each of a plurality of drones to transition from a first location in a first image of an aerial display to a second location in a second image of the aerial display, and transmitting an activation signal to a flight mechanism of the drone, the activation signal transmitted in accordance with the flight plan, the activation signal including instructions that cause the drone to fly the flightpath and at the velocity specified in the flight plane for the drone.

In Example 57, the subject matter of Example 56 optionally includes determining a velocity of the drone during flight; transmitting a first signal to the flight mechanism to increase power to the flight mechanism when the velocity of the drone during flight is less than a preset velocity defined by the flight plane; and transmitting a second signal to the flight mechanism to decrease power to the flight mechanism when the velocity of the drone during flight is greater than the preset velocity defined by the flight plan.

In Example 58, the subject matter of any one or more of Examples 56-57 optionally include wherein the flight plan further defines a lighting configuration for each of the plurality of drones.

In Example 59, the subject matter of Example 58 optionally includes activating a light source of the drone in accordance with the lighting configuration.

In Example 60, the subject matter of any one or more of Examples 58-59 optionally include deactivating a light source of the drone in accordance with the lighting configuration.

Example 61 is at least one computer-readable medium comprising instructions to perform any of the methods of Examples 56-60.

Example 62 is an apparatus comprising means for performing any of the methods of Examples 56-60.

Example 63 is a drone comprising: means for propelling the drone through the air; means for receiving, from a remote computer, a flight plane, the flight plan defining a flightpath and a velocity for each of a plurality of drones to transition from a first location in a first image of an aerial display to a second location in a second image of the aerial display, and means for transmitting an activation signal to the propelling means, the activation signal transmitted in accordance with the flight plan, the activation signal including instructions that cause the drone to fly the flightpath and at the velocity specified in the flight plane for the drone.

In Example 64, the subject matter of Example 63 optionally includes means for determining a velocity of the drone during flight; means for transmitting a first signal to the propelling means to increase power to the propelling means when the velocity of the drone during flight is less than a preset velocity defined by the flight plane; and transmitting a second signal to the propelling means to decrease power to the propelling means when the velocity of the drone during flight is greater than the preset velocity defined by the flight plan.

In Example 65, the subject matter of any one or more of Examples 63-64 optionally include wherein the flight plan further defines a lighting configuration for each of the plurality of drones.

In Example 66, the subject matter of Example 65 optionally includes means for illuminating a portion of the drone in accordance with the lighting configuration.

In Example 67, the subject matter of any one or more of Examples 65-66 optionally include means for de-illuminating a portion of the drone in accordance with the lighting configuration.

Example 68 is at least one computer readable medium including instructions that, when executed by a processor, cause the processor to: receive, at a drone from a remote computer, a flight plane, the flight plan defining a flightpath and a velocity for each of a plurality of drones to transition from a first location in a first image of an aerial display to a second location in a second image of the aerial display, and transmit an activation signal to a flight mechanism of the drone, the activation signal transmitted in accordance with the flight plan, the activation signal including instructions that cause the drone to fly the flightpath and at the velocity specified in the flight plane for the drone.

In Example 69, the subject matter of Example 68 optionally includes instructions that, when executed by the processor, cause the processor to: determine a velocity of the drone during flight; transmit a first signal to the flight mechanism to increase power to the flight mechanism when the velocity of the drone during flight is less than a preset velocity defined by the flight plane; and transmit a second signal to the flight mechanism to decrease power to the flight mechanism when the velocity of the drone during flight is greater than the preset velocity defined by the flight plan.

In Example 70, the subject matter of any one or more of Examples 68-69 optionally include wherein the flight plan further defines a lighting configuration for each of the plurality of drones.

In Example 71, the subject matter of Example 70 optionally includes instructions that, when executed by the processor, cause the processor to activate a light source of the drone in accordance with the lighting configuration.

In Example 72, the subject matter of any one or more of Examples 70-71 optionally include instructions that, when executed by the processor, cause the processor to deactivate a light source of the drone in accordance with the lighting configuration.

Example 73 is at least one machine-readable medium including instructions that, when executed by processing circuitry, cause the processing circuitry to perform operations to implement of any of Examples 1-72.

Example 74 is an apparatus comprising means to implement of any of Examples 1-72.

Example 75 is a system to implement of any of Examples 1-72.

Example 76 is a method to implement of any of Examples 1-72.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A method for generating a morphing sequence for an aerial show, the method comprising:
   receiving, at a computing device comprising a processor, first frame data defining a first location for each of a plurality of drones in a first image of the aerial show;
   receiving, at the computing device, second frame data defining a second location for each of the plurality of drones in a second image of the aerial show;
   selecting, by the computing device, a first subset of the plurality of drones to form a transition from the first image to the second image;
   selecting, by the computing device, a second subset of the plurality of drones that remain static during the transition;
   assigning, by the computing device, a collision avoidance weight that ranges from 0 to 1 to each of the first subset of the plurality of drones based on an importance of the drone in the aerial show;
   generating, by the computing device, the morphing sequence, the morphing sequence defining a flightpath for each of the first subset of the plurality of drones to transition from the first location associated with the first image to the second location associated with the second image, wherein generating the morphing sequence includes applying a collision avoidance weight for each of the plurality of drones; and
   transmitting, by the computing device, the flightpaths for all of the plurality of drones to each of the plurality of drones, wherein each of the plurality of drones is able to fly a respective flight path from the flightpaths of all of the plurality of drones.

2. The method of claim 1, wherein generating the morphing sequence includes minimizing a flight time for each of the first subset of the plurality of drones.

3. The method of claim 1, wherein generating the morphing sequence includes minimizing an overall flight time for the first subset of the plurality of drones.

4. The method of claim I., wherein the collision avoidance weight is equal for each of the first subset of the plurality of drones.

5. The method of claim 1, wherein generating the morphing sequence includes determining a velocity for each of the first subset of the plurality of drones to transition from the first location to the second location.

6. The method of claim 1, further comprising simulating the morphing sequence.

7. The method of claim 6, wherein simulating the morphing sequence includes stepping each of the first subset of the plurality of drones from the first location to the second location in predefined increments of time.

8. The method of claim 1, wherein during the morphing sequence a first subset of the plurality of drones are in a lighted state and a second subset of drones are in an unlighted state.

9. A system for generating a morphing sequence for an aerial show, the system comprising:
a processor; and
a memory including instructions that, when executed by the processor, cause the processor to:
receive first frame data defining a first location for each of a plurality of drones in a first image of the aerial show,
receive second frame data defining a second location for each of the plurality of drones in a second image of the aerial show
select a first subset of the plurality of drones to form a transition from the first image to the second image;
select a second subset of the plurality of drones that remain static during the transition;
assign a collision avoidance weight that ranges from 0 to 1 to each of the first subset of the plurality of drones based on an importance of the drone in the aerial show,
generate the morphing sequence, that includes the application of the collision avoidance weight, defining a flightpath for each of the plurality of drones to transition from the first location associated with the first image to the second location associated with the second image, and
transmit the flightpaths for all of the plurality of drones to each of the plurality of drones,
wherein each of the plurality of drones is operative to fly a respective flight path from the flightpaths transmitted to all of the plurality of drones.

10. The system of claim 9, wherein generating the morphing sequence includes instructions that, when executed by the processor, cause the processor to minimize a flight time for each of the first subset of the plurality of drones.

11. The system of claim 9, wherein generating the morphing sequence includes instructions that, when executed by the processor, cause the processor to minimize an overall flight time for the first subset of the plurality of drones.

12. The system of claim 9, wherein generating the morphing sequence includes instructions that, when executed by the processor, cause the processor to determine a velocity for each of the first subset of the plurality of drones to transition from the first location to the second location.

13. The system of claim 9, further comprising instructions that, when executed by the processor, cause the processor to simulate the morphing sequence.

14. The system of claim 13, wherein simulating the morphing sequence includes instructions that, when executed by the processor, cause the processor to step each of the first subset of the plurality of drones from the first location to the second location in predefined increments of time.

15. A drone comprising:
a flight mechanism;
a processor in electrical communication with the flight mechanism; and
a memory storing instructions that, when executed by the processor, cause the processor to:
receive a plurality of flight plans from a remote computer, the plurality of flight plans including flight plans for a plurality of drones in an aerial show, one of the plurality of flight plans defining a flightpath and a velocity for the drone to transition from a first location in a first image of an aerial display to a second location in a second image of the aerial display, and
transmit an activation signal to the flight mechanism, the activation signal transmitted in accordance with the one of the plurality of flight plans, the activation signal including instructions that cause the drone to:
fly the flightpath and at the velocity specified in the one of the plurality of flight plans for the drone, and
execute a collision avoidance maneuver in accordance with a collision avoidance weight, wherein the collision avoidance weight relates to an effort the drone puts forth to avoid a collision with a stationary drone.

16. The drone of claim 15, further comprising a position sensor, wherein the instructions, when executed by the processor, further cause the processor to:
determine a velocity of the drone during flight;
transmit a first signal to the flight mechanism to increase power to the flight mechanism when the velocity of the drone during flight is less than a preset velocity defined by the one of the plurality of flight plans; and
transmit a second signal to the flight mechanism to decrease power to the flight mechanism when the velocity of the drone during flight is greater than the preset velocity defined by the one of the plurality of flight plans.

17. The drone of claim 15, wherein the plurality of flight plans further defines a lighting configuration for each of the plurality of drones.

18. The drone of claim 17, further comprising a light source, wherein the instructions, when executed by the processor, further cause the processor to activate the light source in accordance with the lighting configuration.

19. The drone of claim 17, further comprising a light source, wherein the instructions, when executed by the processor, further cause the processor to deactivate the light source in accordance with the lighting configuration.

20. The drone of claim 15, wherein the collision avoidance weight is assigned based on an importance of the drone in the aerial show.

21. The drone of claim 15, wherein the collision avoidance weight is 0.5.

* * * * *